United States Patent
Ogino et al.

(10) Patent No.: US 7,575,351 B2
(45) Date of Patent: Aug. 18, 2009

(54) VEHICULAR HEADLAMP

(75) Inventors: Yasuhiko Ogino, Tochigi (JP); Hirohiko Ohshio, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/132,900

(22) Filed: Jun. 4, 2008

(65) Prior Publication Data
US 2008/0304278 A1 Dec. 11, 2008

(30) Foreign Application Priority Data
Jun. 7, 2007 (JP) ............................. 2007-151750

(51) Int. Cl.
*F21V 17/02* (2006.01)
(52) U.S. Cl. ....................... 362/513; 362/284; 362/507; 362/509
(58) Field of Classification Search ......... 362/281–283, 362/507, 512–514, 538
See application file for complete search history.

(56) References Cited

U.S. PATENT DOCUMENTS

| | | | | |
|---|---|---|---|---|
| 4,831,506 A | * | 5/1989 | Miyazawa | .................. 362/526 |
| 6,334,702 B1 | * | 1/2002 | Albou | ........................ 362/514 |
| 6,543,922 B2 | * | 4/2003 | Komatsu et al. | ............ 362/518 |
| 6,550,944 B2 | * | 4/2003 | Kusagaya | ................... 362/466 |
| 6,857,768 B2 | * | 2/2005 | Watanabe et al. | ........... 362/512 |
| 7,118,258 B2 | | 10/2006 | Yamamura et al. | |
| 7,364,331 B2 | * | 4/2008 | Tajima | ....................... 362/509 |
| 7,370,996 B2 | * | 5/2008 | Ohshio | ........................ 362/539 |

* cited by examiner

Primary Examiner—Ali Alavi
(74) Attorney, Agent, or Firm—Osha • Liang LLP (57) ABSTRACT

A vehicular headlamp includes a first reflector disposed fixed with respect to the light source; a second reflector rotatable in a direction that opens and closes a reflective surface of the first reflector; a bracket rotatably supporting the second reflector via a shaft that extends in a direction generally perpendicular to the optical axis of the light source; an actuator attached to the bracket; an attachment includes an insertion hole into which the driving rod of the actuator is inserted and first and second connection holes into which the connecting shaft of the second reflector is inserted. The second reflector includes a connecting shaft that projects in a direction generally perpendicular to an optical axis of the light source. The actuator includes a body and a driving rod that projects from a portion other than a center portion of the body and moves in an axial direction. The first connection hole and the second connection hole of the attachment open one way and open in opposite directions. The actuator is capable of being respectively attached to the bracket of the lamp unit on the left and right sides in orientations that differ by a rotation of 180 degrees in a shaft rotating direction of the driving rod, with the connecting shaft of the second reflector on the left inserted into the first connection hole, and the connecting shaft of the second reflector on the right side inserted into the second connection hole.

11 Claims, 11 Drawing Sheets

VEHICULAR HEADLAMP

BACKGROUND OF INVENTION

1. Field of the Invention

The present invention relates to a vehicular headlamp. More specifically, the present invention relates to an attachment for both right and left sides to be attached to a driving rod of an actuator with a reduced number of parts and improved workability in an assembly operation.

2. Related Art

A vehicular headlamp has a lamp unit that is provided in a lamp chamber formed by a front cover and a lamp body, wherein light emitted from a light source is reflected by a reflector and radiated through a projection lens.

Such a lamp unit may be provided with a first reflector that is arranged in a fixed state with respect to the light source, and a second reflector that is rotatable in a direction that opens and closes a reflective surface of the first reflector (see Patent Document 1 for an example). With the vehicular lamp provided with the first reflector and the second reflector, in a state where the reflective surface of the first reflector is not obstructed, light emitted from the light source is mainly reflected by the first reflector and directed forward. Meanwhile, in a state where the reflective surface of the first reflector is obstructed by the second reflector, light emitted from the light source is mainly reflected by the second reflector and directed forward. Thus, a structure is achieved in which it is possible to switch between a high beam and a low beam depending on a rotation position of the second reflector.

According to the vehicular headlamp described in Patent Document 1, a stepping motor is used as a driving source to rotate the second reflector.

[Patent Document 1] U.S. Pat. No. 7,118,258

SUMMARY OF INVENTION

When a stepping motor is used as the driving source to rotate the second reflector as with the vehicular headlamp described in Patent Document 1, due to the generally high cost of the stepping motor, manufacturing costs have increased.

Thus, in one or more embodiments of the present invention a vehicular headlamp uses an actuator in place of the stepping motor as the driving source to rotate the second reflector, with the actuator having a driving rod movable in an axial direction.

According to embodiments of a vehicular headlamp that uses the actuator having the driving rod as a driving source, the actuator may also include a body in which a driving mechanism that moves the driving rod in the axial direction is arranged. From the standpoint of a layout of parts such as a worm and a gear to operate the driving rod, which effectively utilizes a space inside a body, as FIG. 11 shows, a projecting position of a driving rod c with respect to a body b of an actuator a is positioned displaced with respect to a center M of the body b.

Figure 11:
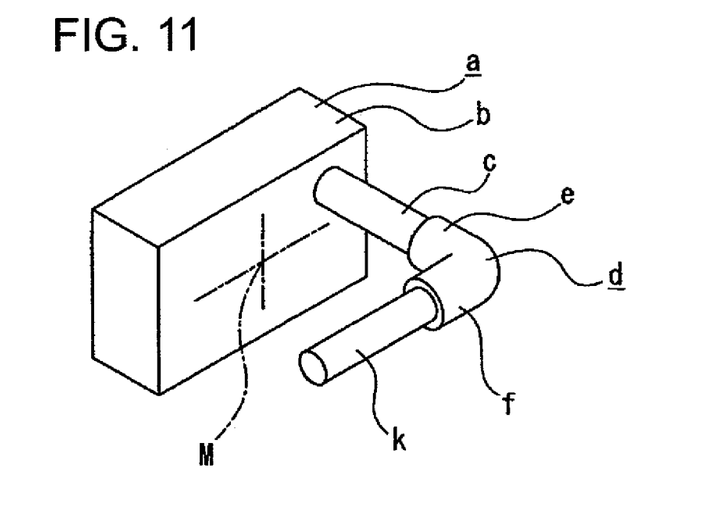
FIG. 11 is a schematic perspective view showing a conventional connecting structure for an actuator and a connecting shaft.
Figure 12:
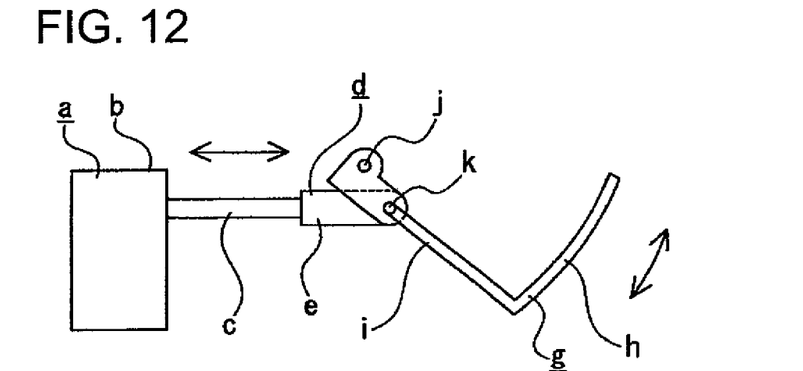
FIG. 12 is a schematic side view showing a conventional connecting structure for the actuator and a reflector.

The driving rod c is attached with an attachment d (see FIGS. 11 and 12). The attachment d is provided with an insertion portion e into which the driving rod c is inserted, and a shaft support portion f that extends in a direction perpendicular to the insertion portion e.

A second reflector g has a reflective portion h and a supported portion i that projects in a direction at a general right angle from a lower end portion of the reflective portion h. A tip end portion of the supported portion i is provided with a rotation fulcrum point j, and a connecting shaft k is provided at a position toward a tip end of the supported portion i. The connecting shaft k is inserted into and rotatably supported by the shaft support portion f of the attachment d.

When the driving mechanism disposed inside the body b in the actuator a is operated, the driving rod c moves together with the attachment d in the axial direction, and the second reflector g is rotated with the rotation fulcrum point j acting as a fulcrum.

However, it should be noted that the vehicular headlamp is respectively installed on both right and left end portions of a vehicle body, and the portions are arranged symmetrical to one another in a right-left direction. Therefore, the driving rods c, c are also formed with shapes laterally symmetric to one another.

Figure 13:
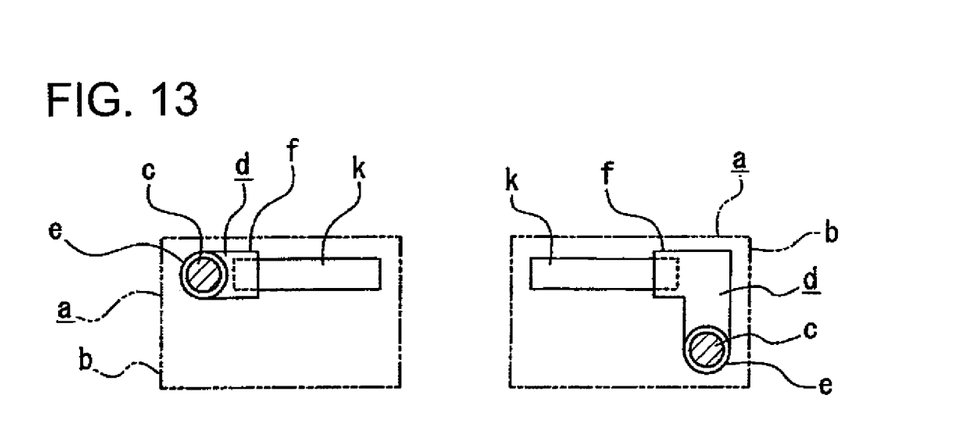
FIG. 13 is a schematic frontal view showing related art.

Because the driving rods c, c are formed with shapes laterally symmetric to one another, as FIG. 13 shows, to position either of the driving rods c, c in the right and left actuators a, a on an outer side, for example, an arrangement is employed where one actuator a has an orientation that is a 180-degree pivot around an axial direction of the driving rods c, c from an orientation of the other actuator a. Thus, the right and left actuators a, a have different positions in a height direction of the driving rods c, c with respect to the connecting shafts k, k. It is therefore necessary to form the right and left attachments d, d into different shapes that correspond to the respective positional relationships between the connecting shafts k, k and the driving rods c, c, which results in a corresponding increase in the number of parts and also increases manufacturing costs.

In addition, because it is necessary to install two vehicular headlamps on a right side and a left side of one body, assembly mistakes related to assembling an attachment on the wrong side may occur.

In accordance with one or more embodiments of the present invention, a vehicular headlamp has a reduced number of parts and improved workability in an assembly operation.

In one or more embodiments, a vehicular headlamp according to the present invention includes: a first reflector disposed fixed with respect to the light source; a second reflector rotatable in a direction that opens and closes a reflective surface of the first reflector, and having a connecting shaft that projects in a direction generally perpendicular to an optical axis of the light source; a bracket rotatably supporting the second reflector via a shaft that extends in a direction generally perpendicular to the optical axis of the light source; an actuator attached to the bracket, and having a body and a driving rod that projects from a portion other than a center portion of the body and moves in an axial direction; and an attachment having an insertion hole into which the driving rod of the actuator is inserted and first and second connection holes into which the connecting shaft of the second reflector is inserted. The first connection hole and the second connection hole of the attachment open one way and open in opposite directions. The actuator is respectively attached to the bracket of the lamp unit on the left side and the bracket of the lamp unit on the right side in orientations that differ by a rotation of 180 degrees in a shaft rotating direction of the driving rod, with the connecting shaft of the second reflector on the left inserted into the first connection hole, and the connecting shaft of the second reflector on the right side inserted into the second connection hole.

Thus, according to one or more embodiments of the vehicular headlamp of the present invention, the same attachment may be used for both right and left sides, respectively, and insertion directions of the driving rod of the left-side actuator and the driving rod of the right-side actuator into the attachment are opposite directions.

A vehicular headlamp respectively disposed on a right side and a left side of a vehicle body and comprising a lamp unit that is disposed in a lamp chamber formed by a lamp body and a front cover, wherein light emitted from a light source is reflected by reflective means and radiated, the vehicular headlamp characterized by including: a first reflector disposed fixed with respect to the light source; a second reflector rotatable in a direction that opens and closes a reflective surface of the first reflector, and having a connecting shaft that projects in a direction generally perpendicular to an optical axis of the light source; a bracket rotatably supporting the second reflector via a shaft that extends in a direction generally perpendicular to the optical axis of the light source; an actuator attached to the bracket, and having a body and a driving rod that projects from a portion other than a center portion of the body and moves in an axial direction; and an attachment having an insertion hole into which the driving rod of the actuator is inserted and first and second connection holes into which the connecting shaft of the second reflector is inserted, wherein the first connection hole and the second connection hole of the attachment open one way and open in opposite directions, and the actuator is respectively attached to the bracket of the lamp unit on the left side and the bracket of the lamp unit on the right side in orientations that differ by a rotation of 180 degrees in a shaft rotating direction of the driving rod, with the connecting shaft of the second reflector on the left inserted into the first connection hole, and the connecting shaft of the second reflector on the right side inserted into the second connection hole.

Accordingly, it is possible to use attachments with the same size and shape for both the right and left actuators, which enables a reduction in manufacturing cost due to a smaller number of parts.

Furthermore, in the right-side second reflector and the left-side reflector, the right and left connecting shafts are each only insertable into one of the connection holes, making it possible to prevent incorrect insertion of the right and left connecting shafts into the first connection hole and the second connection hole. As a consequence, workability can be improved with respect to assembly of the vehicular headlamp.

According to one or more embodiments of the present invention, the first connection hole and the second connection hole of the attachment are formed generally perpendicular to an axial direction of the connection holes and formed into oval shapes long in a direction generally perpendicular to an axial direction of the driving rod. Therefore, rotational movement of the second reflector can be smoothly performed.

According to one or more embodiments of the present invention, a reflector unit is structured by assembling the second reflector to the bracket, and assembling the actuator to the bracket via the attachment. Also, the reflector unit is assembled to the first reflector. Thus, there is no need to separately assemble the bracket, the second reflector, and the actuator to the first reflector, making it possible to improve workability in the assembly operation.

According to one or more embodiments of the present invention, the attachment is provided with an insertion portion having an insertion hole, and a connection portion having a first connection hole and a second connection hole. The insertion portion and the connection portion are provided at positions where a center axis of the insertion hole does not intersect with a center axis of the connection holes. Moreover, the connection portion is provided at a position nearer than the insertion portion to a rotation fulcrum point of the second reflector. Therefore, the insertion portion of the attachment is positioned recessed away from the bracket. As a consequence, during assembly of the attachment to the driving rod, the insertion portion of the attachment does not contact the bracket, thereby achieving improved workability during assembly of the attachment to the driving rod.

Other aspects and advantages of the invention will be apparent from the following description, the drawings and the claims.

DETAILED DESCRIPTION

Hereinafter, embodiments of a vehicular headlamp in accordance with the present invention will be described with reference to the accompanying drawings.

Figure 1:
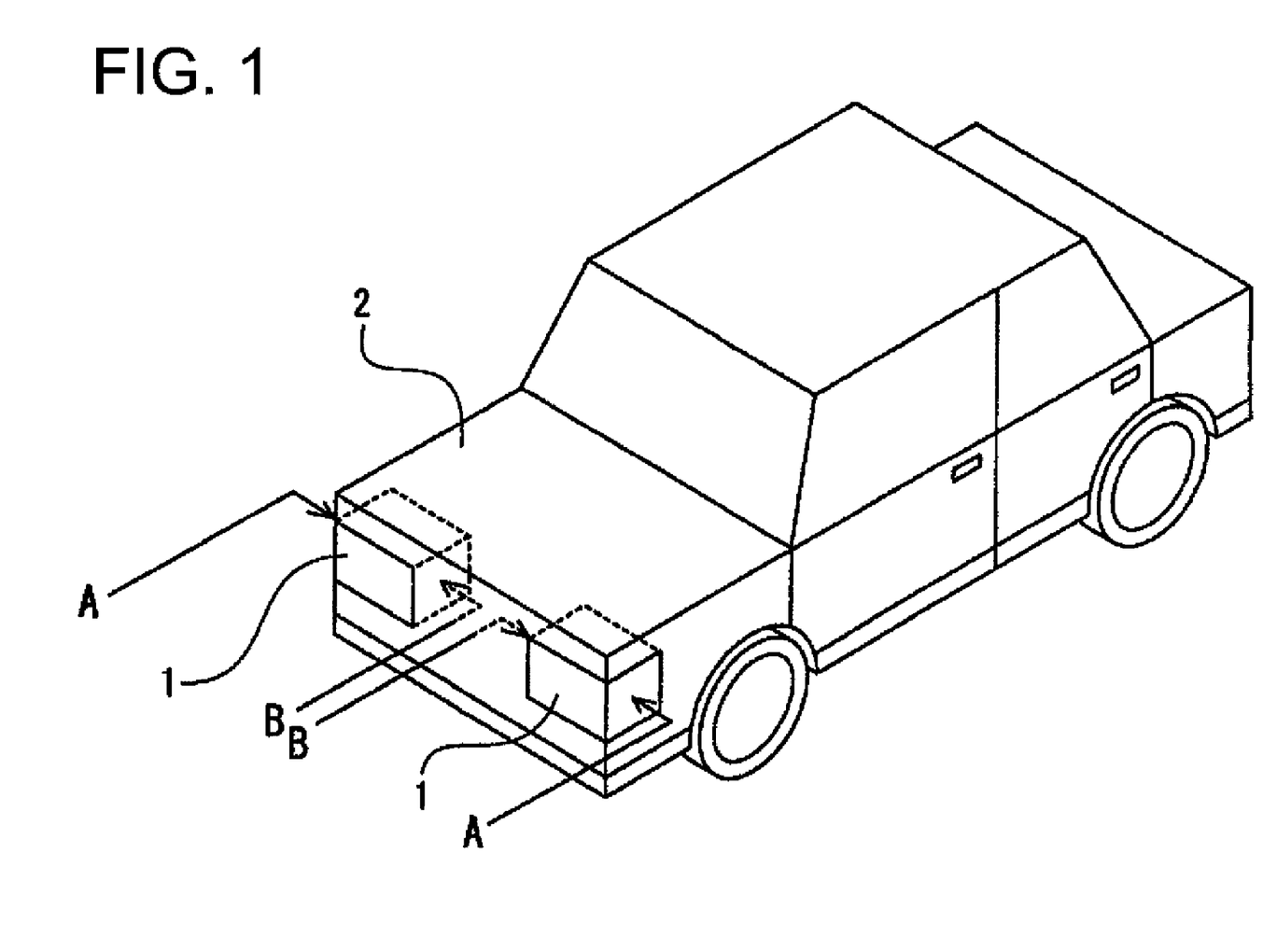
FIG. 1 shows an embodiment of a vehicular headlamp according to the present invention, together with FIGS. 2 to 10, and is a schematic perspective view of a vehicle shown installed with the vehicular headlamp.

As FIG. 1 shows, vehicular headlamps 1, 1 are arranged and installed in both right and left end portions of a front end portion of a body 2. The vehicular headlamps 1, 1 are shaped laterally symmetric to one another.

Figure 2:
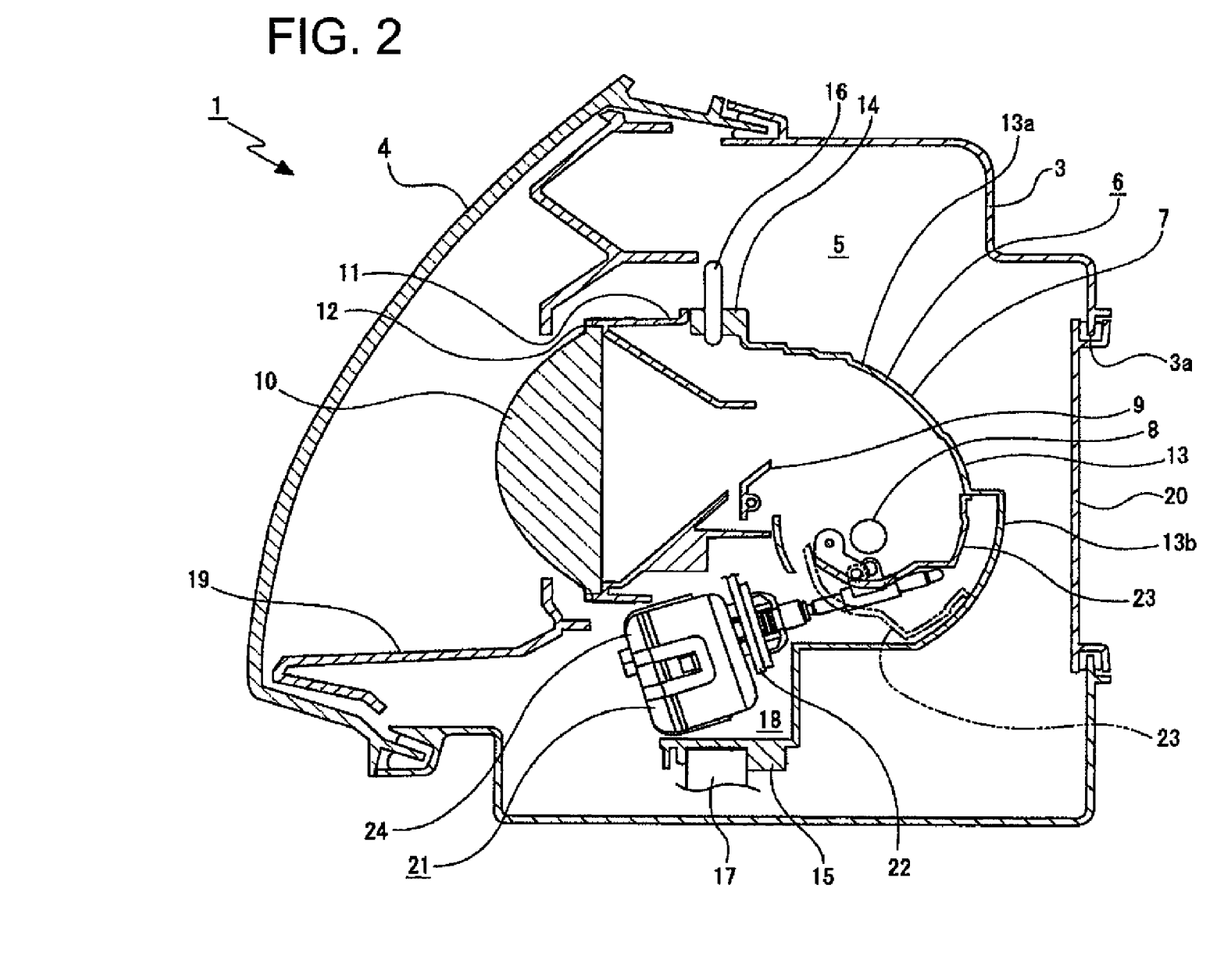
FIG. 2 is a schematic cross-sectional view of the vehicular headlamp in accordance with an embodiment of the present invention.

The vehicular headlamp 1, as FIG. 2 shows, includes a lamp body 3 that has a concave portion opening forward, and a front cover 4 that obstructs the front opening of the lamp body 3. An internal space formed by the lamp body 3 and the front cover 4 serves as a lamp chamber 5.

A rear end portion of the lamp body 3 is formed with an attachment opening 3a that runs front to back therethrough.

In the lamp chamber 5, there is a lamp unit 6 rotatable in a horizontal direction with respect to the lamp body 3. The lamp unit 6 includes the following: a first reflector 7; a light source 8 such as a discharge lamp; a shade 9 with a light blocking function; a projection lens 10 arranged forward of the light source 8; and a lens holder 11 that holds the projection lens 10 and is attached to the first reflector 7. The projection lens 10, when attached to the lens holder 11, is retained by an attachment ring 12 so as to be held by the lens holder 11.

The first reflector 7 includes the following: a light reflective portion 13; an upper-side supported portion 14 that is provided on an upper end portion of the light reflective portion 13 and continues from a front end thereof; and a lower-side supported portion 15 that is provided on a lower end portion of the light reflective portion 13 and continues from a front end thereof. The light reflective portion 13 is formed from an upper-side portion 13a and a lower-side projection portion 13b that continues from a lower end of the upper-side portion 13a. The lower-side projection portion 13b projects rearward with respect to the upper-side portion 13a. The upper-side supported portion 14 and the lower-side supported portion 15 are rotatably supported by rotation shafts 16, 17, respectively. The upper-side supported portion 14 and the lower-side supported portion 15 serve as rotation fulcrum points in a horizontal direction of the lamp unit 6.

The shade 9 is rotatably supported by a rotation mechanism (not shown) forward of the light source 8.

A layout space 18 opening forward is formed between the lens holder 11 and the lower-side supported portion 15 of the first reflector 7 in the lamp unit 6.

An extension 19 for obstructing a portion of the lamp unit 6 is disposed in the lamp chamber 5.

A back cover 20 that obstructs the attachment opening 3a is attached to the rear end portion of the lamp body 3.

A reflector unit 21 is arranged inside the layout space 18 and the first reflector 7 of the lamp unit 6.

Figure 3:
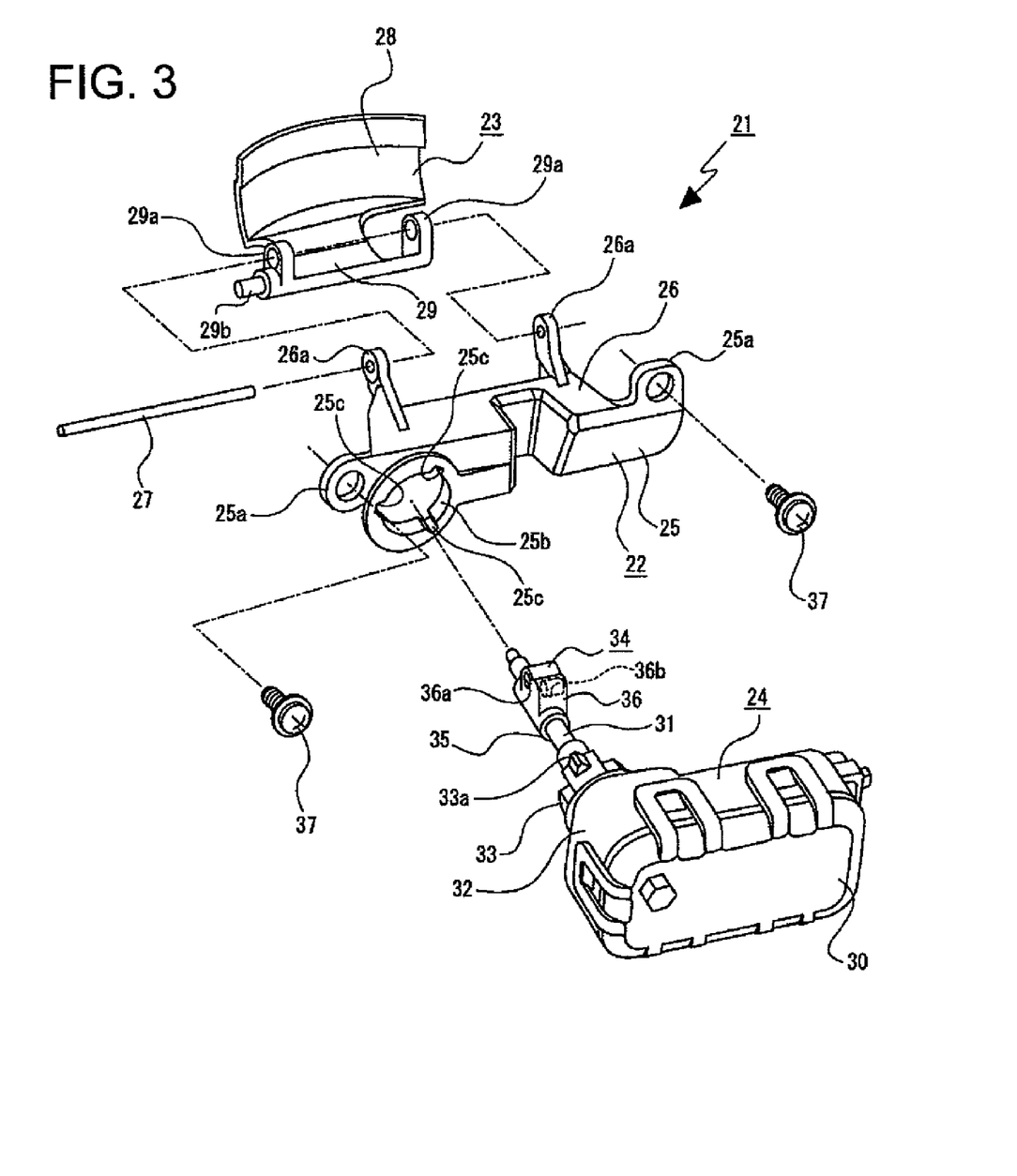
FIG. 3 is an exploded perspective view of a reflector unit in accordance with an embodiment of the present invention.
Figure 4:
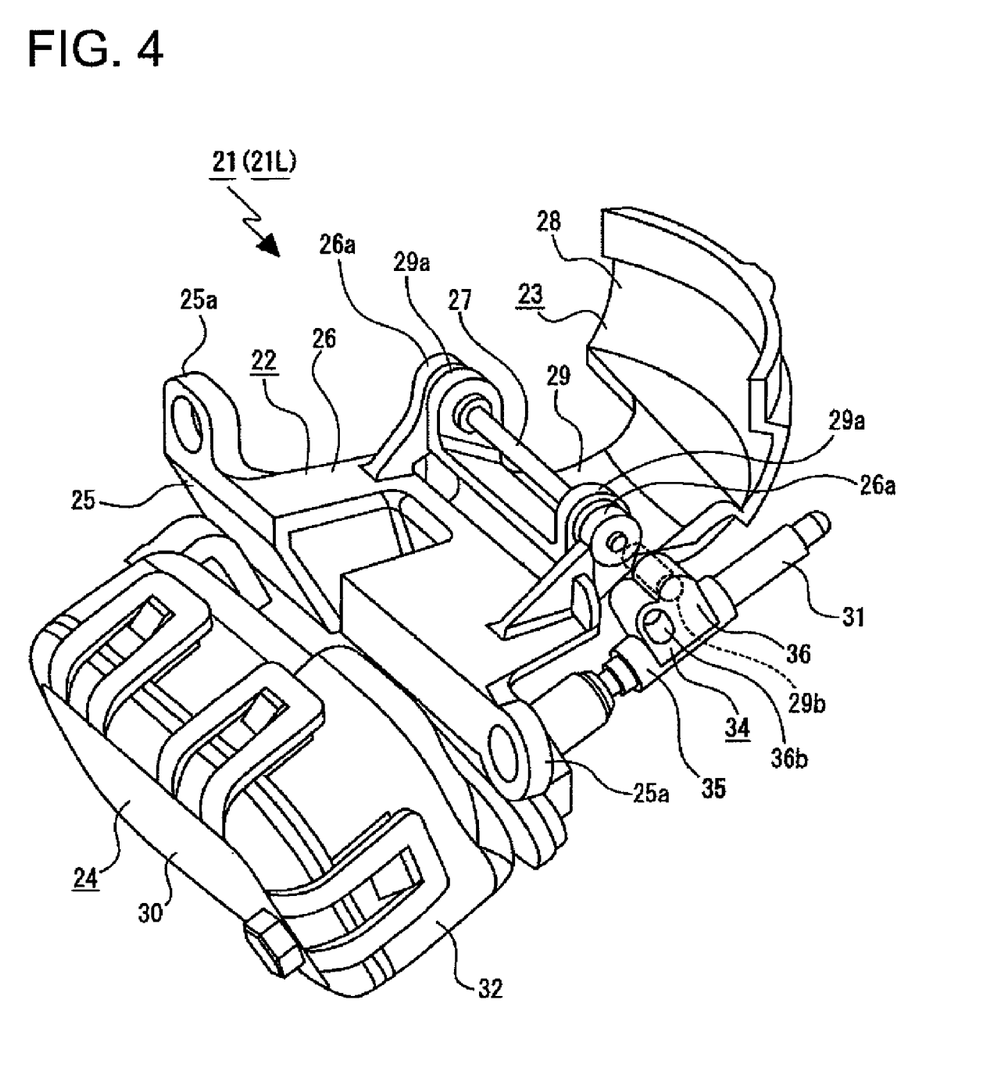
FIG. 4 is a perspective view showing a left-side reflector unit in accordance with an embodiment of the present invention.
Figure 5:
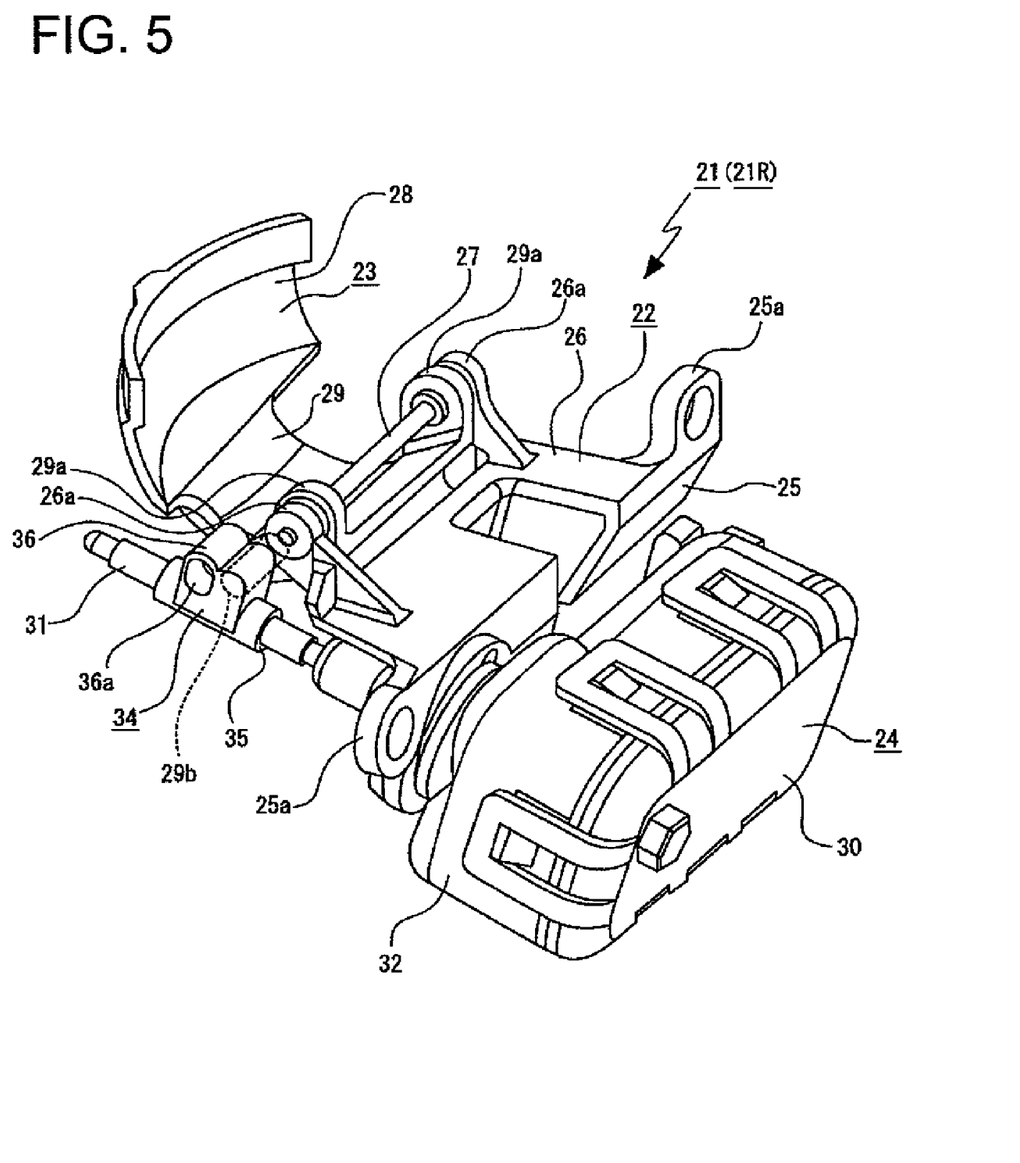
FIG. 5 is a perspective view showing a right-side reflector unit in accordance with an embodiment of the present invention.

The reflector unit 21, as shown in FIGS. 3 to 5, includes a bracket 22, a second reflector 23, and an actuator 24, and these, in combination, structure the reflector unit 21.

The bracket 22 is formed by integrating an attachment surface portion 25 that faces a general front-back direction and a projection portion 26 that projects rearward from the attachment surface portion 25.

Both right and left end portions of the attachment surface portion 25 are respectively provided with attached pieces 25a, 25a. One end portion in a right-left direction of the attachment surface portion 25 is formed with a retaining hole 25b, and a peripheral surface that forms the retaining hole 25b is also formed with slits 25c, 25c, 25c spaced in a peripheral direction. Regarding the brackets 22, 22, as shown in FIGS. 4 and 5, the right-side bracket 22 and the left-side bracket 22 are formed with shapes laterally symmetric to one another, wherein the retaining hole 25b of the left-side bracket 22 is formed on a left end portion of the attachment surface portion 25, and the retaining hole 25b of the right-side bracket 22 is formed on a right end portion of the attachment surface portion 25.

Shaft supporting projection portions 26a, 26a that project upward are provided laterally spaced on a rear end portion of the projection portion 26. A shaft 27 is inserted into and rotatably supported by the shaft supporting projection portions 26a, 26a.

The second reflector 23 is structured with a light reflective portion 28 and a supported projection surface portion 29 that projects from a lower end portion of the light reflective portion 28 generally forward are integrally formed. Shaft supported pieces 29a, 29a that project generally upward are provided on a front end portion of the supported projection surface portion 29. A connecting shaft 29b that projects sideward is also provided on the front end portion of the supported projection surface portion 29. Regarding the second reflectors 23, 23, as shown in FIGS. 4 and 5, the right-side second reflector 23 and the left-side second reflector 23 are formed with shapes laterally symmetric to one another, wherein the connecting shaft 29b of the left-side second reflector 23 projects leftward from a left-side surface of the supported projection surface portion 29, and the connecting shaft 29b of the right-side second reflector 23 projects rightward from a right-side surface of the supported projection surface portion 29.

Further, regarding the second reflector 23, a shaft 27 supported by the shaft supporting projection portions 26a, 26a of the bracket 22 is insertedly fixed to supported pieces 29a, 29a, and the second reflector 23 is rotatably supported on the bracket 22 via the shaft 27.

The actuator 24 has a body 30 and a driving rod 31 that projects generally rearward from the body 30.

The body 30 is formed such that a driving mechanism (not shown) that moves the driving rod 31 in the axial direction is arranged inside a case 32, and the driving mechanism is structured by various parts such as a worm and a gear. A rear surface of the case 32 is provided with an attached projection portion 33, and an outer peripheral surface of the attached projection portion 33 is provided with engagement projection portions 33a, 33a, 33a that are spaced in a peripheral direction.

The driving rod 31 can be moved in the axial direction by the driving mechanism. Based on the standpoint of effectively utilizing space inside the body 30 for a more compact configuration, the driving rod 31 may be positioned such that a projecting position with respect to the body 30 is displaced from a center of the body 30.

Figure 6:
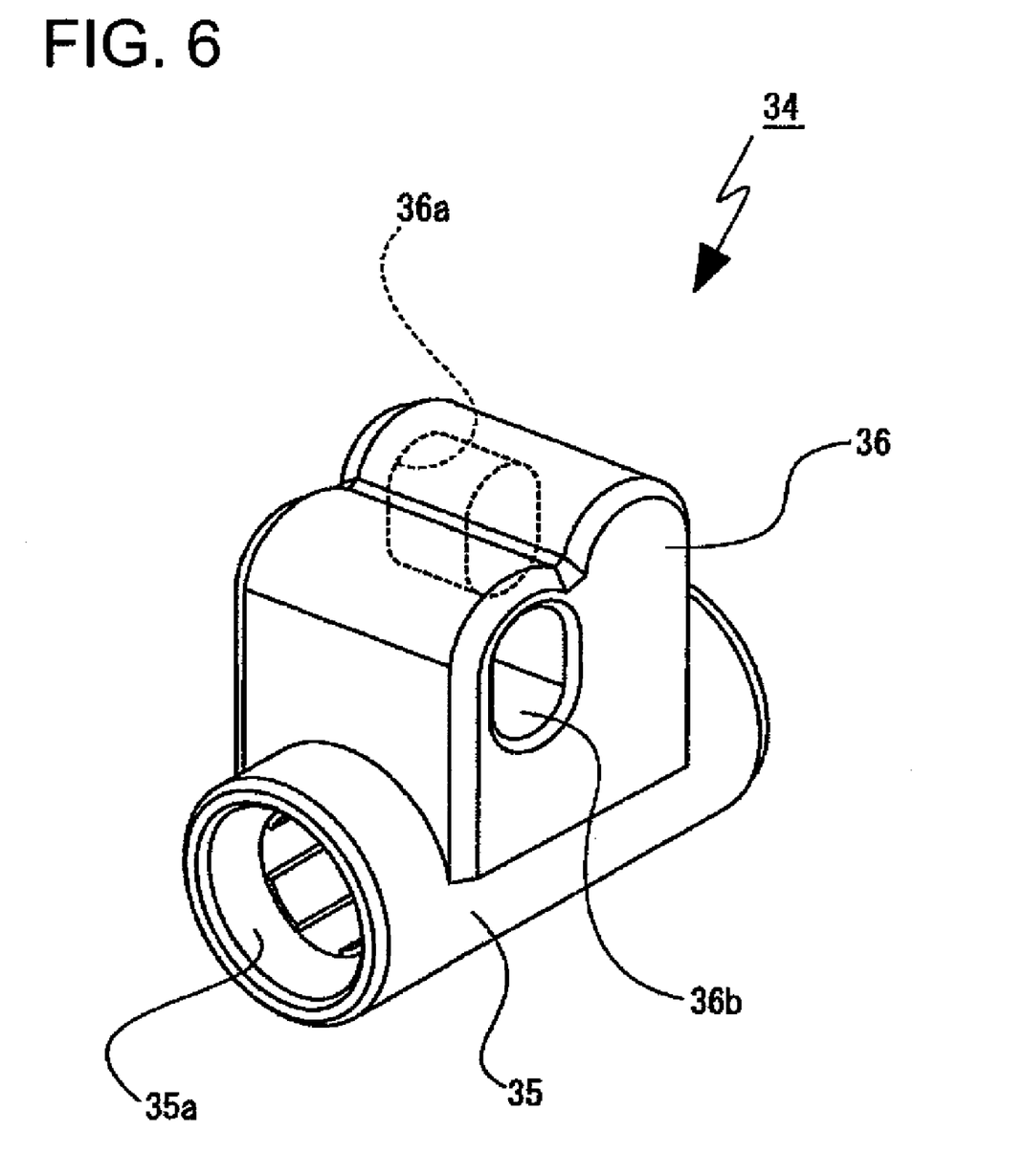
FIG. 6 is an enlarged perspective view of an attachment in accordance with an embodiment of the present invention.

The driving rod 31 is attached with an attachment 34. As FIG. 6 shows, the attachment 34 is formed such that a cylindrical insertion portion 35 that extends in a general front-rear direction and a connection portion 36 that projects generally upward from an intermediate portion in an axial direction of the insertion portion 35 are integrally formed.

A hole of the insertion portion 35 is formed as an insertion hole 35a.

The connection portion 36 is formed with a first connection hole 36a and a second connection hole 36b that open sideward and are spaced in the axial direction of the insertion portion 35. The first connection hole 36a and the second connection hole 36b are formed at positions with differing heights, and open sideward in opposing directions. The first connection hole 36a and the second connection hole 36b are formed into oval shapes that are long in a direction perpendicular to the axial direction of the insertion portion 35 and perpendicular to an opening direction thereof.

In this manner, the first connection hole 36a and the second connection hole 36b are structured so as to be formed at different positions in the axial direction of the insertion portion 35 and at differing heights, with both also positioned coaxially without rightward-leftward displacement. Therefore, it is possible to reduce a width in the right-left direction of the attachment 34 by a corresponding amount.

Regarding the actuator 24, the driving rod 31 and the attached projection portion 33 are inserted from a forward direction into a support hole 25b, which is formed in the attachment surface portion 25 of the bracket 22. When the attached projection portion 33 is inserted into the support hole 25b, the engagement projection portions 33a, 33a, 33a are inserted into the slits 25c, 25c, 25c, respectively. The actuator 24 is attached to the bracket 22 by inserting the engagement projection portions 33a, 33a, 33a up to a rearward portion of the attachment surface portion 25, and then engaging the engagement projection portions 33a, 33a, 33a with a rear-side opening rim of the support hole 25b by rotating to a predetermined degree in a shaft rotating direction of the driving rod 31.

When attached to the left-side bracket 22 and when attached to the right-side bracket 22, the orientation of the actuator 24 differs by a rotation of 180 degrees in the shaft rotating direction of the driving rod 31. Accordingly, in a state where the actuator 24 is attached to the left-side bracket 22, the driving rod 31 is positioned on a left end side of the bracket 22 and the second reflector 23 (see FIG. 4), while in a state where the actuator 24 is attached to the right-side bracket 22, the driving rod 31 is positioned on a right end side of the bracket 22 and the second reflector 23 (see FIG. 5).

The reflector units 21, 21, as FIG. 1 shows, are respectively attached to the first reflectors 7, 7 from outer sides (sides A, A indicated in FIG. 1) with respect to the vehicle body 2, for example. Furthermore, the first reflectors 7, 7 are respectively formed with light source attachment holes (not shown) that open to an inner side that is opposite of a side on which the reflector units 21, 21 are assembled. The light sources 8, 8 are respectively assembled on the first reflectors 7, 7 via the light source attachment holes from an inner side (sides B, B indicated in FIG. 1) with respect to the vehicle body 2.

The connecting shaft 29b provided on the left-side second reflector 23, as FIG. 4 shows, is inserted into the first connection hole 36a of the attachment 34 from the right so as to be rotatably connected. The connecting shaft 29b provided on the right-side second reflector 23, as FIG. 5 shows, is inserted into the second connection hole 36b of the attachment 34 from the left so as to be rotatably connected.

As described above, the second reflectors 23, 23 are rotatably supported on the brackets 22, 22 via the shafts 27, 27. The actuators 24, 24 are attached to the brackets 22, 22 with the attachments 34, 34 joined with the driving rods 31, 31. And the connecting shafts 29b, 29b of the second reflectors 23, 23 are connected with the attachments 34, 34. Thus, the respective structures of the left-side reflector unit 21L (see FIG. 4) and the right-side reflector unit 21R (see FIG. 5) are achieved.

In this manner, where the bracket 22, the second reflector 23, the actuator 24, and the attachment 34 are assembled to structure the reflector unit 21, the bracket 22 is attached to the first reflector 7. The bracket 22 is attached to the first reflector 7 by attachment screws 37, 37 that are inserted into the attached pieces 25a, 25a, for example. In a state where the bracket 22 is attached to the first reflector 7, the projection portion 26 of the bracket 22, the second reflector 23, the driving rod 31 of the actuator 24, and the attachment 34 are positioned inside the first reflector 7, with the attachment surface portion 25 of the bracket 22 and the body 30 of the actuator 24 positioned in the layout space 18 (see FIG. 2).

The second reflector 23 is in a rotatable state on a side where the light reflective portion 28 is in front of the light reflective portion 13 of the first reflector 7.

As described above, the actuator 24 set at a position most forward among the reflector unit 21 is positioned in the layout space 18 formed on the lower side of the lens holder 11. Therefore, the reflector unit 21 does not project farther forward than the lens holder 11, and allows for a more compact lamp unit 6.

In addition, because the extension 19 is positioned in the vicinity of the projection lens 10, and the reflector unit 21 does not farther forward than the lens holder 11, the reflector unit 21 and the extension 19 do not interfere with one another and a sufficient space for disposing the extension 19 can be secure. Also, the extension 19 can be disposed at a required position without the need for any design modifications, such as modifying the shape of the extension 19 or the like.

Regarding the lamp unit 6, in a state where the bracket 22, the second reflector 23, the actuator 24, and the attachment 34 are assembled to structure the reflector unit 21, the bracket 22 is attached to the first reflector 7. Consequently, there is no need to individually assemble the bracket 22, the second reflector 23, and the actuator 24 into the first reflector 7 in a small space, thereby achieving improved workability during the assembly operation.

Furthermore, because the reflector unit 21 is already structured when the bracket 22 is attached to the first reflector 7, it is possible to prevent contact between the second reflector 23 and the first reflector 7 while the bracket 22 is being attached to the first reflector 7.

Moreover, the actuator 24 is attached to the bracket 22 by rotation in the shaft rotating direction of the driving rod 31 in a state where the attached projection portion 33 of the actuator 24 is inserted into the support hole 25b of the bracket 22. Consequently, there is no need for providing an attachment projection portion on the case 32 for threadedly mounting the bracket 22, thus making the actuator 24 that much more compact An operation to rotate the actuator 24 in the shaft rotating direction of the driving rod 31 to attach the actuator 24 to the bracket 22 is performed before attaching the bracket 22 to the first reflector 7. Therefore, the actuator 24 does not contact any portion of the first reflector 7 during rotation, making it possible to easily perform that attachment operation of the actuator 24 to the bracket 22.

Figure 7:
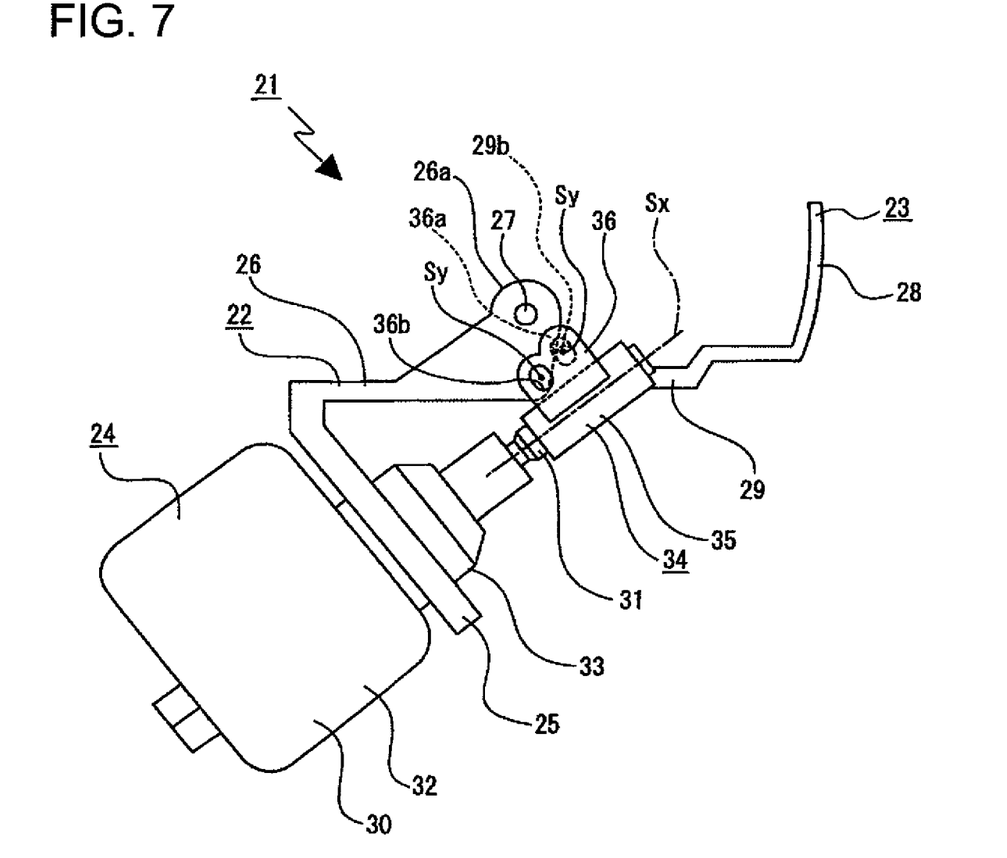
FIG. 7 is a schematic enlarged side view showing a positional relationship between the attachment and a bracket in accordance with an embodiment of the present invention.

The attachment 34, as described above, is formed such that a cylindrical insertion portion 35 that extends in a general front-rear direction and a connection portion 36 that projects generally upward from an intermediate portion in an axial direction of the insertion portion 35 are integrally formed. Accordingly, as FIG. 7 shows, regarding the attachment 34, a center axis Sx of the insertion hole 35a and center axes Sy, Sy of the first connection hole 36a and the second connection hole 36b do not intersect, and the connection portion 36 is provided at a position nearer than the insertion portion 35 to the shaft 27, which acts as a rotation fulcrum point for the second reflector 23.

By forming the attachment 34 with such a configuration, the insertion portion 35 of the attachment 34 is positioned recessed downward away from the projection portion 26 of the bracket 22. Therefore, during assembly of the attachment 34 to the driving rod 31, the insertion portion 35 of the attachment 34 does not contact the bracket 22, thereby achieving improved workability during assembly of the attachment 34 to the driving rod 31.

Figure 8:
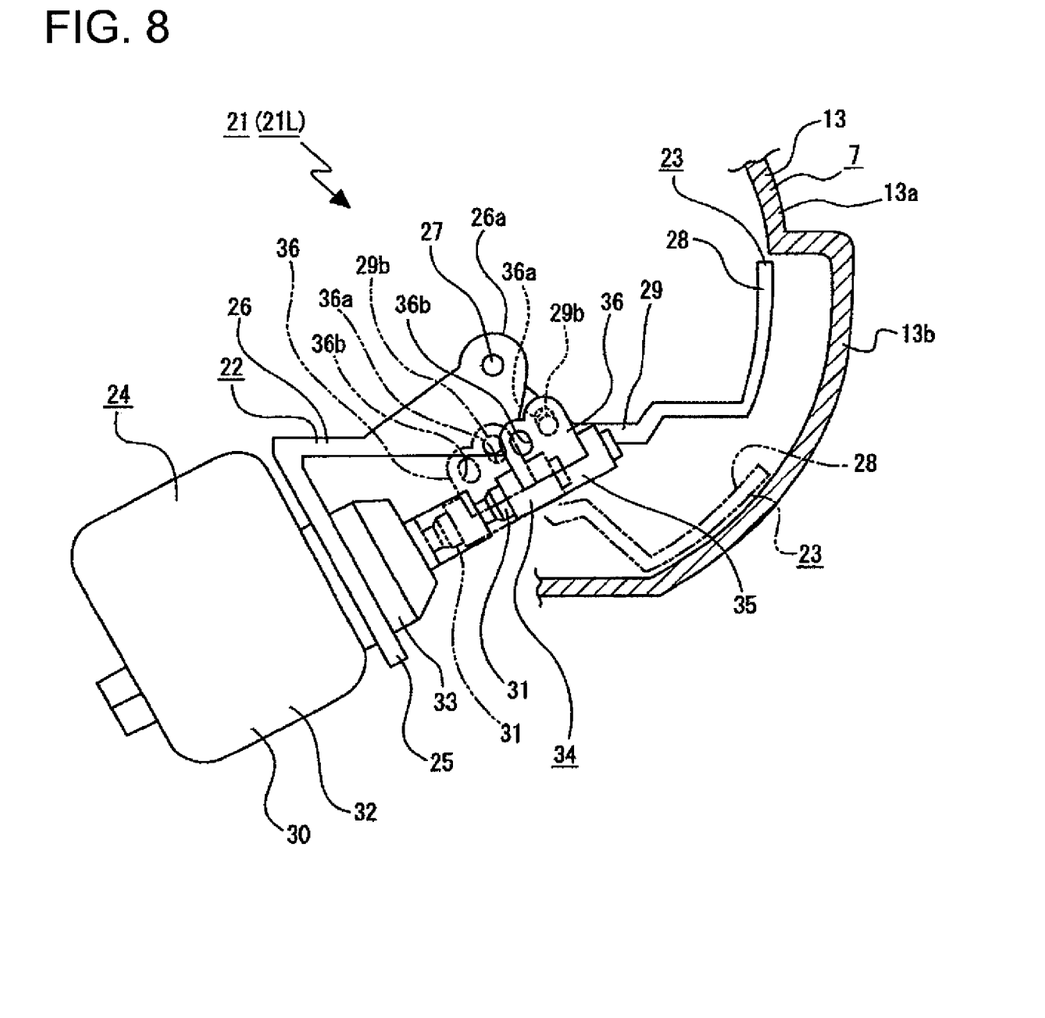
FIG. 8 is a schematic side view showing the operation of the left-side reflector unit in accordance with an embodiment of the present invention.
Figure 9:
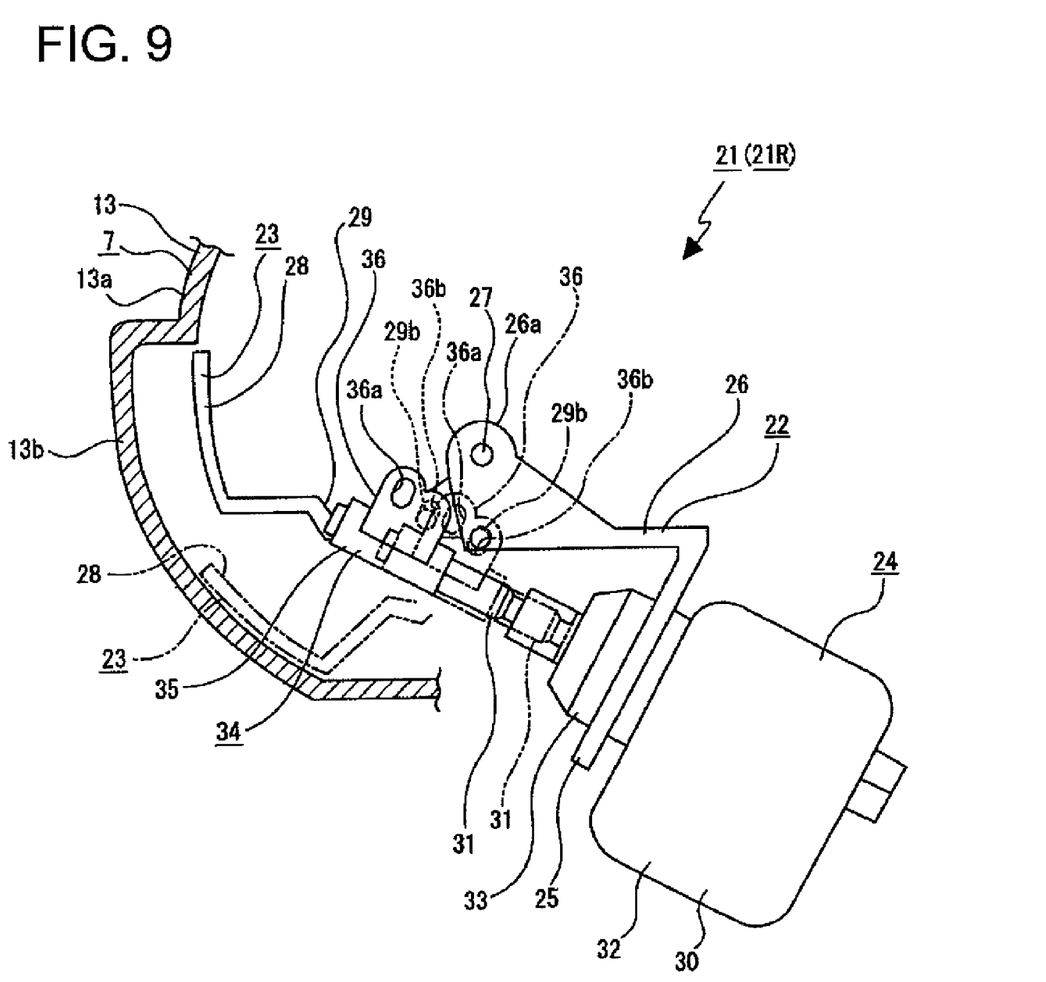
FIG. 9 is a schematic side view showing the operation of the right-side reflector unit in accordance with an embodiment of the present invention.

In the reflector unit 21 structured as described above, operation of the actuator 24 moves the driving rod 31 and the attachment 34 integrated therewith so as to rotate the second reflector 23 (see FIGS. 8 and 9).

For example, in a state where the second reflector 23 is set to an non-obstructing position at which the light reflective portion 13 of the first reflector 7 is not obstructed (a two-dashed line in FIG. 8), moving the driving rod 31 away from the body 30 in a projecting direction leads to rotation of the second reflector 23, with the shaft 27 acting as a fulcrum, toward an obstructing position at which the light reflective portion 13 is obstructed. The light reflective portion 28 of the second reflector 23 is thus positioned in front of the light reflective portion 13 and the obstructing position is reached, resulting in obstruction of the light reflective portion 13 (a solid line in FIG. 8). At this time, because the first connection hole 36a and the second connection hole 36b of the attachment 34 are formed long in a generally up-down direction, the connecting shaft 29b of the second reflector 23 moves the first connection hole 36a and the second connection hole 36b generally in the up-down direction. As a consequence, rotational movement of the second reflector 23 can be smoothly performed.

In a state where the second reflector 23 is set at the obstructing position at which the light reflective portion 13 of the first reflector 7 is obstructed, light emitted from the light source 8 is mainly reflected by the light reflective portion 28 of the second reflector 23 and directed forward. Thereafter, such light passes through the projection lens 10 and the front cover 4, and is radiated.

Meanwhile, in a state where the second reflector 23 is set to the obstructing position at which the light reflective portion 13 of the first reflector 7 is obstructed (a two-dashed line in FIG. 9), moving the driving rod 31 in a direction toward the body 30 leads to rotation of the second reflector 23, with the shaft 27 acting as a fulcrum, toward the non-obstructing position at which the light reflective portion 13 is not obstructed. The second reflector 23 thus moves away from in front of the light reflective portion 13 and the non-obstructing position is reached, resulting in non-obstruction of the light reflective portion 13 (a solid line in FIG. 9). At this time, similar to above, the connecting shaft 29b of the second reflector 23 moves the first connection hole 36a and the second connection hole 36b generally in the up-down direction. As a consequence, rotational movement of the second reflector 23 can be smoothly performed.

In a state where the second reflector 23 is set at the non-obstructing position at which the light reflective portion 13 of the first reflector 7 is not obstructed, light emitted from the light source 8 is mainly reflected by the light reflective portion 13 of the first reflector 7 and directed forward. Thereafter, such light passes through the projection lens 10 and the front cover 4, and is radiated.

As explained above, the vehicular headlamp 1 utilizes the attachment 34 having the first connection hole 36a into which the connecting shaft 29b of the left-side driving rod 31 is inserted, and the second connection hole 36b into which the connecting shaft 29b of the right-side driving rod 31 is inserted. By orientating the driving rods 31, 31 wherein one driving rod 31 is rotated 180 degrees from the other driving rod 31 in the shaft rotating direction, the right and left actuators 24, 24 are respectively arranged. Therefore, it is possible to use the attachments 34, 34 with the same size and shape for both the right and left actuators 24, 24, which enables a reduction in manufacturing cost due to a smaller number of parts.

Also, the right and left actuators 24, 24 are respectively arranged by orienting the driving rods 31, 31 such that one driving rod 31 is rotated 180 degrees from the other driving rod 31 in the shaft rotating direction. Therefore, neither of the actuators 24, 24 is arranged projecting sideward from either of the brackets 22, 22, and such effective utilization of the layout space enables more compact vehicular headlamps 1, 1.

Furthermore, the first connection hole 36a and the second connection hole 36b of the attachments 34, 34 are open one way and open in opposite directions. Therefore, the right and left connecting shafts 29b, 29b are each only insertable into one of the connection holes 36a, 36b, making it possible to prevent incorrect insertion of the right and left connecting shafts 29b, 29b into the first connection hole 36a and the second connection hole 36b. As a consequence, workability can be improved with respect to assembly of the vehicular headlamps 1, 1.

Figure 10:
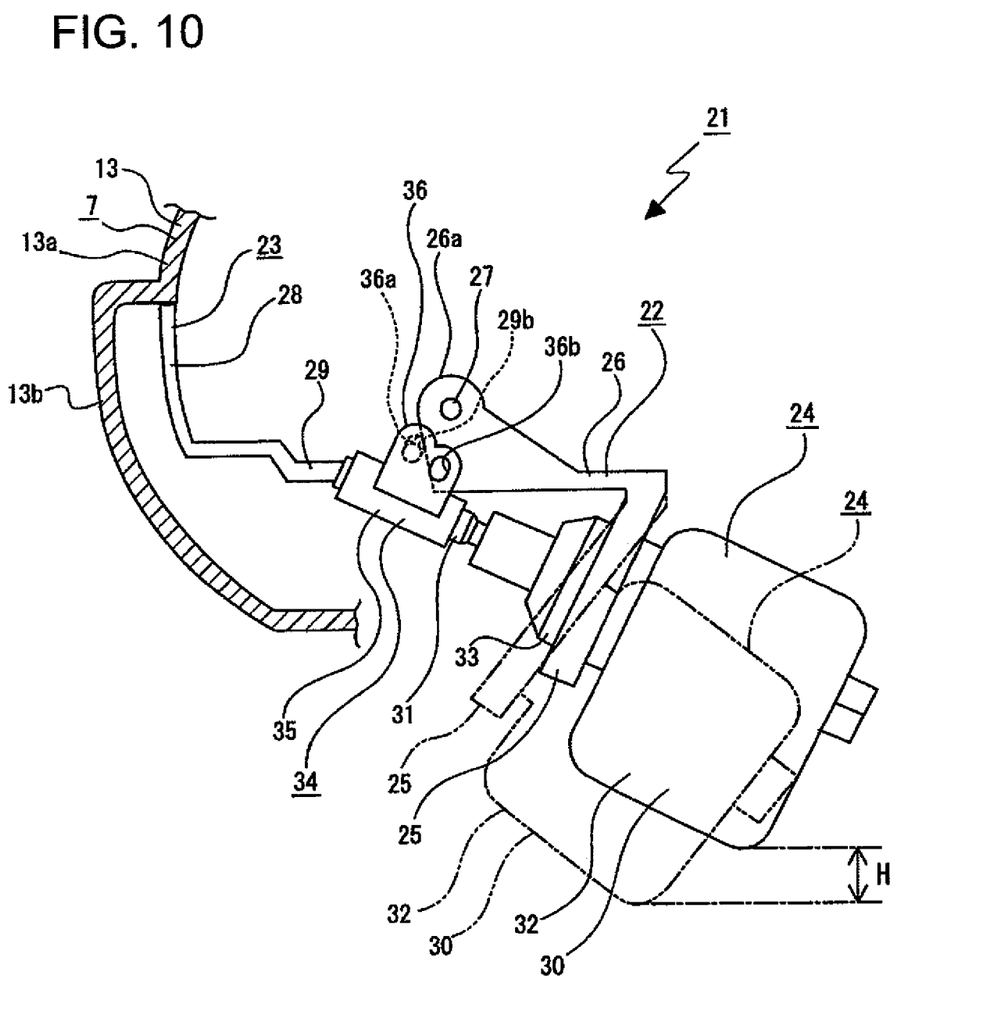
FIG. 10 is a schematic side view showing an example that modifies a tilt angle of an attachment surface portion of the bracket in accordance with an embodiment of the present invention.

Note that as described above, in the actuator 24, a projecting position of the driving rod 31 from the body 30 is positioned displaced with respect to the center of the body 30. Accordingly, in a state where the one of the right and left actuators 24 is assembled to the bracket 22, the body 30 of the actuator 24 significantly projects downward from the attachment surface portion 25 of the bracket 22 (a two-dashed line in FIG. 10), which may increase a width in the up-down direction of the vehicular headlamp 1 by a corresponding amount. In such case, as shown by a solid line in FIG. 10, changing a tilt angle of the attachment surface portion 25 of the bracket 22 positions the body 30 of the actuator 24 farther upward. This, in turn, reduces the width in the up-down direction of the vehicular headlamp 1 by a width H indicated in FIG. 10, whereby the vehicular headlamp 1 may be made more compact.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

1 VEHICULAR LAMP
2 VEHICLE BODY
3 LAMP BODY
4 FRONT COVER
5 LAMP CHAMBER
6 LAMP UNIT
7 FIRST REFLECTOR
8 LIGHT SOURCE
10 PROJECTION LENS
21 REFLECTOR UNIT
22 BRACKET
23 SECOND REFLECTOR
24 ACTUATOR
27 SHAFT
29b CONNECTING SHAFT
30 BODY
31 DRIVING ROD
34 ATTACHMENT
35 INSERTION PORTION
35a INSERTION HOLE
36 CONNECTION PORTION
36a FIRST CONNECTION HOLE
36b SECOND CONNECTION HOLE

What is claimed is:

1. A vehicular headlamp capable of being respectively disposed on a right side and a left side of a vehicle body, the vehicular headlamp comprising:
a lamp unit disposed in a lamp chamber formed by a lamp body and a front cover, wherein light emitted from a light source of the lamp unit is reflected and radiated therefrom;
a first reflector disposed fixed with respect to the light source;
a second reflector rotatable in a direction that opens and closes a reflective surface of the first reflector, wherein the second reflector comprises a connecting shaft that projects in a direction generally perpendicular to an optical axis of the light source;

a bracket rotatably supporting the second reflector via a shaft that extends in a direction generally perpendicular to the optical axis of the light source;

an actuator attached to the bracket, wherein the actuator comprises:

a body; and a driving rod that projects from a portion other than a center portion of the body and moves in an axial direction; and an attachment comprising:

an insertion hole into which the driving rod of the actuator is inserted and first and second connection holes into which the connecting shaft of the second reflector is inserted, wherein the first connection hole and the second connection hole of the attachment open one way and open in opposite directions, and wherein the actuator is capable of being respectively attached to the bracket of the lamp unit on the left side and the bracket of the lamp unit on the right side in orientations that differ by a rotation of 180 degrees in a shaft rotating direction of the driving rod, with the connecting shaft of the second reflector on the left inserted into the first connection hole, and the connecting shaft of the second reflector on the right side inserted into the second connection hole.

2. The vehicular headlamp according to claim 1, wherein the first connection hole and the second connection hole of the attachment are formed generally perpendicular to an axial direction of the connection holes and formed into oval shapes long in a direction generally perpendicular to an axial direction of the driving rod.

3. The vehicular headlamp according to claim 1, wherein a reflector unit is structured by assembling the second reflector to the bracket, and assembling the actuator to the bracket via the attachment, and wherein the reflector unit is assembled to the first reflector.

4. The vehicular headlamp according to claim 1, wherein the attachment is provided with an insertion portion having an insertion hole, and a connection portion having a first connection hole and a second connection hole, wherein the insertion portion and the connection portion are provided at positions where a center axis of the insertion hole does not intersect with a center axis of the connection holes, and wherein the connection portion is provided at a position nearer than the insertion portion to a rotation fulcrum point of the second reflector.

5. The vehicular headlamp according to claim 2, wherein a reflector unit is structured by assembling the second reflector to the bracket, and assembling the actuator to the bracket via the attachment, and wherein the reflector unit is assembled to the first reflector.

6. The vehicular headlamp according to 2, wherein the attachment is provided with an insertion portion having an insertion hole, and a connection portion having a first connection hole and a second connection hole, wherein the insertion portion and the connection portion are provided at positions where a center axis of the insertion hole does not intersect with a center axis of the connection holes, and wherein the connection portion is provided at a position nearer than the insertion portion to a rotation fulcrum point of the second reflector.

7. The vehicular headlamp according to 3, wherein the attachment is provided with an insertion portion having an insertion hole, and a connection portion having a first connection hole and a second connection hole, wherein the insertion portion and the connection portion are provided at positions where a center axis of the insertion hole does not intersect with a center axis of the connection holes, and wherein the connection portion is provided at a position nearer than the insertion portion to a rotation fulcrum point of the second reflector.

8. A vehicular headlamp comprising:

a first reflector disposed fixed with respect to a light source such that light emitted from the light source is reflected by a reflective surface of the first reflector and transmitted from the vehicular headlamp;

a second reflector rotatable so as to intercept light emitted from the light source from reaching the reflective surface of the first reflector or allow light emitted from the light source to reach the reflective surface of the first reflector, wherein the second reflector comprises a connecting shaft that projects in a direction generally perpendicular to an optical axis of the light source;

a bracket rotatably supporting the second reflector via a shaft that extends in a direction generally perpendicular to the optical axis of the light source;

an actuator attached to the bracket, wherein the actuator comprises:

a body; and a driving rod that projects from a portion other than a center portion of the body and moves in an axial direction; and an attachment comprising:

an insertion hole into which the driving rod of the actuator is inserted; and first and second connection holes into which the connecting shaft of the second reflector is inserted, wherein the first connection hole and the second connection hole of the attachment open one way and open in opposite directions, and wherein the actuator is capable of being respectively attached to the bracket of the lamp unit on the left side and the bracket of the lamp unit on the right side in orientations that differ by a rotation of 180 degrees in a shaft rotating direction of the driving rod, with the connecting shaft of the second reflector on the left inserted into the first connection hole, and the connecting shaft of the second reflector on the right side inserted into the second connection hole.

9. The vehicular headlamp according to claim 8, wherein the first connection hole and the second connection hole of the attachment are formed generally perpendicular to an axial direction of the connection holes and formed into oval shapes long in a direction generally perpendicular to an axial direction of the driving rod.

10. The vehicular headlamp according to claim 8, wherein a reflector unit is structured by assembling the second reflector to the bracket and assembling the actuator to the bracket via the attachment, and the reflector unit is assembled to the first reflector.

11. The vehicular headlamp according to 8, wherein
the attachment is provided with an insertion portion having an insertion hole, and a connection portion having a first connection hole and a second connection hole,
the insertion portion and the connection portion are provided at positions where a center axis of the insertion hole does not intersect with a center axis of the connection holes, and
the connection portion is provided at a position nearer than the insertion portion to a rotation fulcrum point of the second reflector.

\* \* \* \* \*